United States Patent
Pan et al.

(10) Patent No.: US 11,112,081 B2
(45) Date of Patent: Sep. 7, 2021

(54) LIGHT DEVICE WITH HOLLOW COLUMN LIGHT GUIDE FOR VEHICLE

(71) Applicant: TAN DE TECH CO., LTD., Douliu (TW)

(72) Inventors: Chung Chiang Pan, Douliu (TW); Cheng Chih Lai, Douliu (TW); Chao Pai Lee, Douliu (TW)

(73) Assignee: TAN DE TECH CO., LTD., Douliu (TW)

(*) Notice: Subject to any disclaimer, the term of this patent is extended or adjusted under 35 U.S.C. 154(b) by 0 days.

(21) Appl. No.: 16/700,033

(22) Filed: Dec. 2, 2019

(65) Prior Publication Data

US 2021/0164632 A1 Jun. 3, 2021

(51) Int. Cl.
| F21S 41/24 | (2018.01) |
| F21V 8/00 | (2006.01) |
| F21S 41/32 | (2018.01) |
| F21S 41/151 | (2018.01) |
| F21S 41/143 | (2018.01) |
| F21V 7/00 | (2006.01) |
| F21S 41/141 | (2018.01) |

(52) U.S. Cl.
CPC ............ *F21S 41/24* (2018.01); *F21S 41/143* (2018.01); *F21S 41/151* (2018.01); *F21S 41/32* (2018.01); *F21V 7/0083* (2013.01); *G02B 6/0096* (2013.01); *F21S 41/141* (2018.01)

(58) Field of Classification Search
CPC ...... G02B 6/0096; F21S 41/24; F21S 41/143; F21S 41/25; F21S 41/32; F21V 5/007; F21V 7/0083
See application file for complete search history.

(56) References Cited

U.S. PATENT DOCUMENTS

| | | | | |
|---|---|---|---|---|
| 2003/0147154 A1* | 8/2003 | Shimizu | ............. | G02B 27/0994 359/819 |
| 2004/0179367 A1* | 9/2004 | Takeda | ....................... | B60Q 1/04 362/466 |
| 2008/0151547 A1* | 6/2008 | Grotsch | ................. | F21V 29/763 362/257 |
| 2009/0073712 A1* | 3/2009 | Yamamura | ............. | F21S 41/663 362/519 |
| 2012/0140463 A1* | 6/2012 | Kinzer | .................... | F21V 5/007 362/231 |
| 2013/0182453 A1* | 7/2013 | Masuda | ................. | F21S 41/336 362/511 |
| 2015/0085523 A1* | 3/2015 | Gurtl | ........................ | F21S 41/24 362/607 |
| 2015/0252975 A1* | 9/2015 | Nakada | .................. | F21S 41/143 362/521 |

(Continued)

*Primary Examiner* — Rajarshi Chakraborty
*Assistant Examiner* — Michael Chiang
(74) *Attorney, Agent, or Firm* — Muncy, Geissler, Olds & Lowe, P.C.

(57) ABSTRACT

A light device for a vehicle includes an emitting module, a light condensing lens and a light guide. The light guide has a hollow column defining a light incident side and a light output side away from each other, both sides respectively faced to the emitting module and the light condensing lens, and the hollow column in help of the light guide avoiding material degradation phenomena and structure deforming problem and prolonging the life usage compared with other materials such as solid-transparent plastic or silicone.

7 Claims, 7 Drawing Sheets

(56) References Cited

U.S. PATENT DOCUMENTS

| | | | |
|---|---|---|---|
| 2016/0047511 A1* | 2/2016 | Jones | F21V 5/045 |
| | | | 362/581 |
| 2016/0368414 A1* | 12/2016 | Son | F21S 41/143 |
| 2017/0009951 A1* | 1/2017 | Lin | F21S 41/322 |
| 2017/0146204 A1* | 5/2017 | Di Trapani | G02B 3/0062 |
| 2018/0142854 A1* | 5/2018 | Nakao | B60Q 1/0683 |
| 2019/0072255 A1* | 3/2019 | Kato | F21S 41/143 |
| 2020/0116323 A1* | 4/2020 | Nykerk | F21S 41/143 |
| 2020/0340631 A1* | 10/2020 | Mertens | F21V 5/048 |

* cited by examiner

LIGHT DEVICE WITH HOLLOW COLUMN LIGHT GUIDE FOR VEHICLE

BACKGROUND OF THE INVENTION

1. Field of the Invention

This invention pertains to a light device for vehicle; especially to a light source capable of casting a desirable illumination for the automobile.

2. Description of the Related Art

Recently, in compliance with the traffic regulation, the vehicles are requested to deploy main beams, low beams, turn signals at both sides of front along with the prevailing daytime running lights (DRL) in the limited areas for headlight installation. Along with the changeable vehicle outlooks and a growing number of headlights items, the spaces for each lamp have largely been reduced which also shrinks the illumination areas. Even so, the headlight installation still need to conform to the regulatory norms on the light luminance, distribution pattern and the irradiation angle for the sake of driving safety.

SUMMARY OF THE INVENTION

This invention pertains to a light device for vehicle capable of distributing an elongated narrow pattern with desirable luminance.

To achieve this goal, the light device for vehicle comprises an emitting module, a light condensing lens and a light guide. The light guide forms a hollow column defining one light incident side and one light output side away from each other, and each sides are respectively deployed with the emitting module and the light condensing lens.

Besides, the light guide has a housing consisted of at least two chassis, and each of the chassis has a number of adjacent side walls.

The hollow column of light guide provides illumination guidance having an interior geometrically shaping the light boundary for casting an appropriate distribution pattern and waiving the element degradation caused from overheated. Furthermore, a solid column is deployed in the light guide so as to recommend to provide a light blending purpose or as a structural support avoid an overheated deformation.

The light device for vehicle may be equipped with a modularized construct. The emitting module may be deployed with only one emitting element having quantity in correspondence with that of the light guide and that of the light condensing lens, or the emitting module may be arranged with a main source located at the center bilaterally arranged with two secondary elements for light compensation in order to generate an elongated distribution pattern and to provide a sufficient illumination in a confined spaces of the light device for vehicle. Furthermore, the emitting element may be electrically connected to a dimmer for adjusting the light intensity compensation.

DETAILED DESCRIPTION OF PREFERRED EMBODIMENTS

Below description proceeds following a direction of headlight projection for a better understanding by the technicians in related arts; to be more specifically elaborate the invention, construction and achievement, the drawings will be mentioned along with the embodiment as below.

Figure 1:
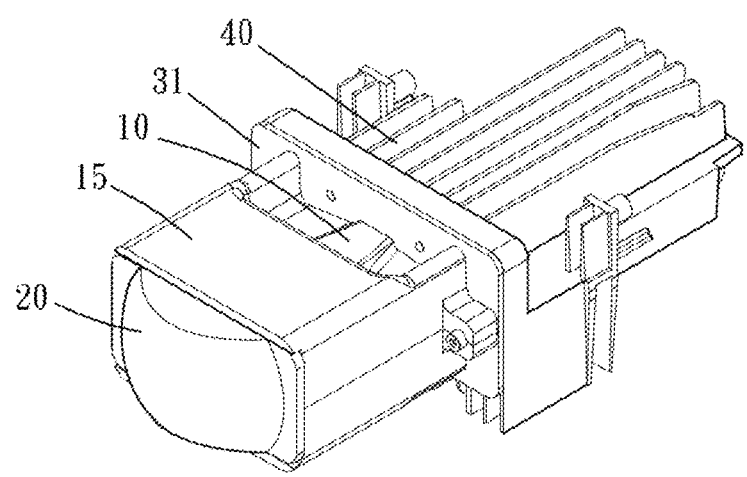
FIG. 1 illustrates a perspective view of low beam for vehicle.
Figure 2:
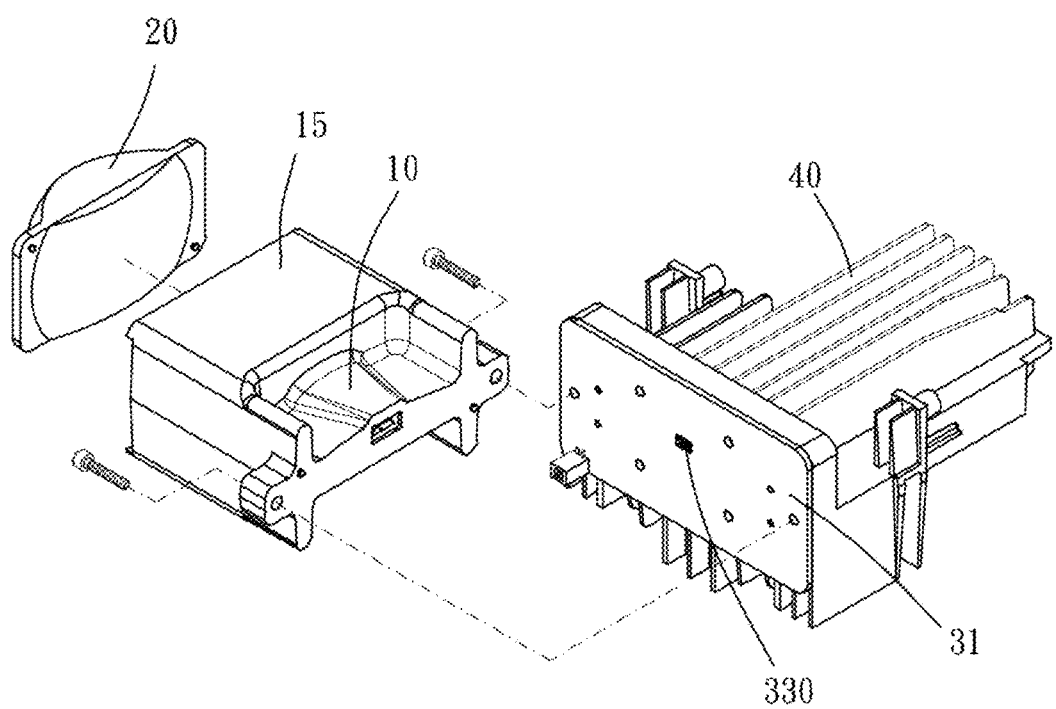
FIG. 2 illustrates an explosive view of the device for vehicle shown in FIG. 1.
Figure 3:
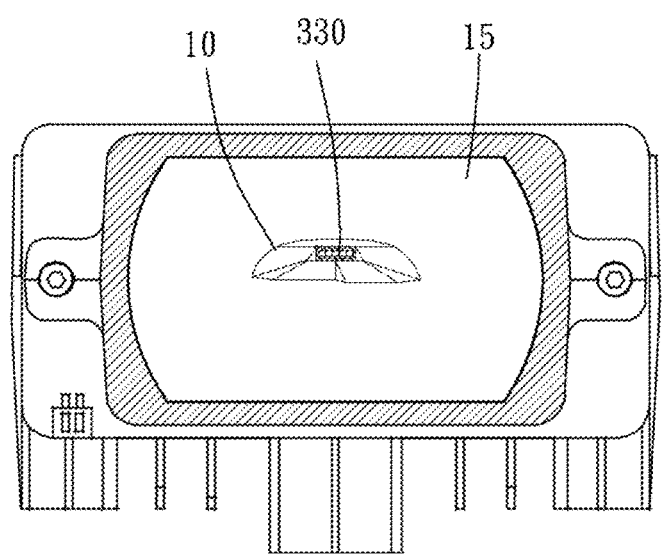
FIG. 3 illustrates a cross-sectional view of the hollow column of the light guide.
Figure 4:
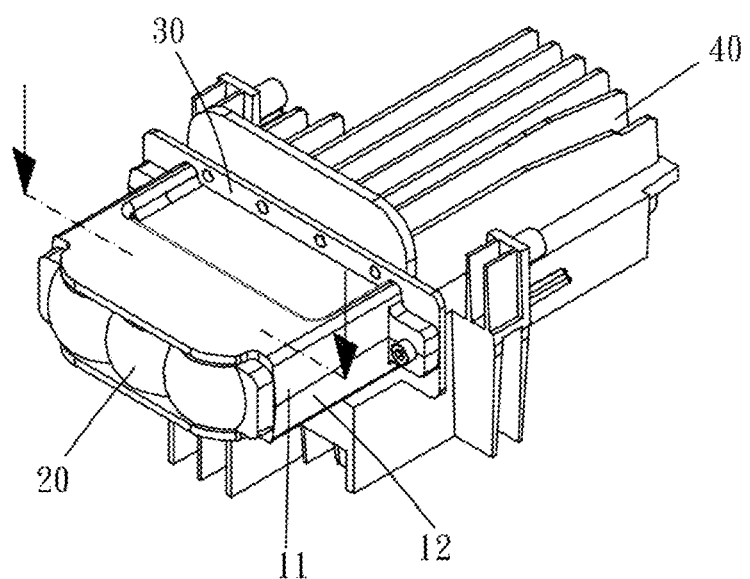
FIG. 4 illustrates another perspective view of the light device for vehicle in another embodiment.
Figure 5:
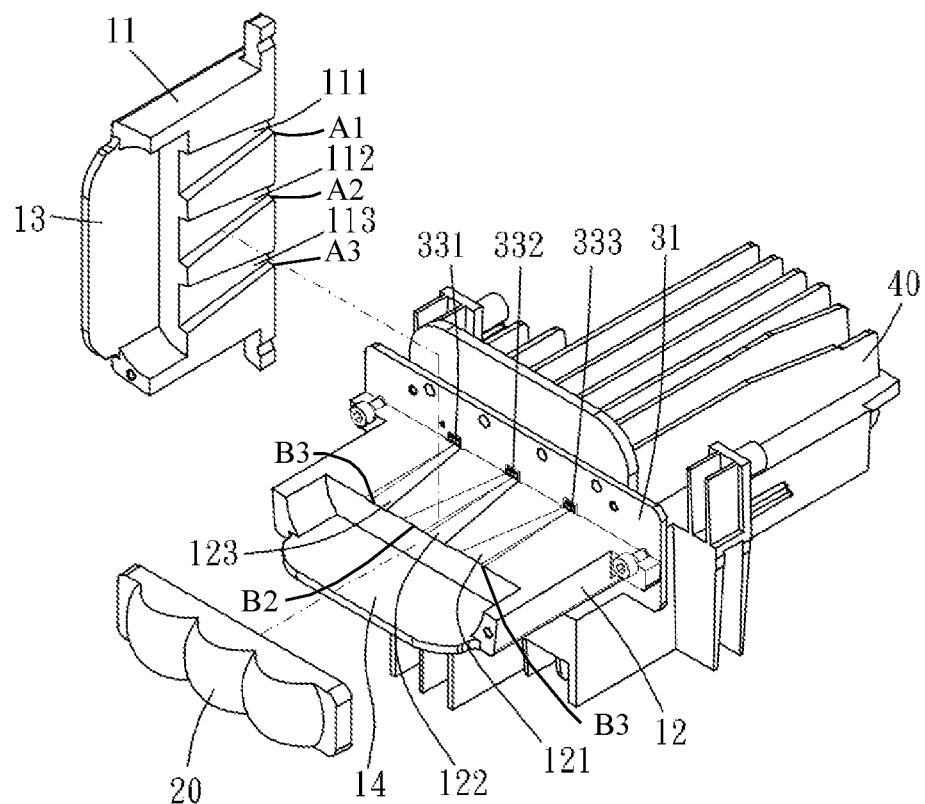
FIG. 5 illustrates another explosive view of the device for vehicle shown in FIG. 4.

FIG. 1 to FIG. 3 illustrate a low beam device for vehicle is arranged, from front to rear, with a light condensing lens 20, a housing 15 integrated with a light guide 10, an emitting module 30 and a radiating fins 40. The light guide 10 has an interior of hollow column applied with a reflective film, and the housing 15 and the light guide form into an integral deployable for the light condensing lens 20 and the emitting module 30. And the radiating fins 40 is perpendicular to the emitting module 30.

In this embodiment, the emitting module 30 has a base 31 to accommodate an emitting elements 330, and the light guide 10 has an hollow interior defining a light incident side and a light output side away from each other. The emitting module 30 is mounted on the light output side and the light condensing lens 20 is deployed nearby the light incident side and wielded on the housing 15 by way of ultrasonic. Besides, the hollow interior of light guide converges in shape from the light incident side toward the light output side, and both of them are respectively responsible for the light intensity and the distribution pattern. The light beam outputs from the emitting elements 330 having been concentrated and modified by the light condensing lens 20 in exchange for a uniformity light intensity in order to project out a desirable distribution pattern.

By modularizing the emitting module 30 and the light guide 10 into a light device of miniature is adaptable for a light compensation or for other illumination purposes.

As shown in FIG. 4 to FIG. 7, the light device for vehicle with differences from the previous embodiment lie in the emitting module 30 comprising a main emitting element 332 and two secondary emitting elements 332, 333 bilaterally arranged beside the main emitting element 332. Three emitting elements 331, 332, 333 are disposed at equal distance on the base 31 in an elongated formation about 2 cm. The light condensing lens 20 has a quantity in correspondence with that of the emitting elements to be disposed at relative positions and arranged in alignment. In this embodiment, the light guide 10 includes an upper chassis 11 and a lower chassis 12, and the upper chassis 11 and the lower chassis 12 can be assembled into a hollow column by the connection of their linking edges where is deployed with a plurality of protruding or indenting side walls 111, 112, 113, 121, 122, 123, 111 pairing with 121, 112 pairing with 122, and 113 pairing with 123. These side walls define a plurality of light inlet A1, A2, A3 of the hollow columns nearby the plurality of emitting modules 30 and a plurality of light outlet B1, B2, B3 of the hollow columns nearby the light condensing lens 20. The hollow column has a quantity and position in correspondence with that of the emitting elements. The side walls 111, 112, 113, 121, 122, 123, applied with metallic reflective film, constitute the hollow column and define a light incident side and a light output side. The emitting elements 331, 332, 333 and the curve surfaces of the light condensing lens 20 respectively direct to the light incident side and the light output side of the hollow column. The light condensing lens 20 concentrates and modifies the propagated from the light output side before projecting out a distribution pattern.

By deploying a main emitting element and two bilateral emitting elements for light compensation in order to generate an elongated distribution pattern can not only satisfy the illumination intensity but also reduce the installation area of light device for vehicle. Furthermore, the employment of a hollow column enables the light guide not only guide the light source propagated from the emitting module to process light uniformity and shape the distribution pattern of desire by the internal contour of side walls, but also prolong the life time for usage compared with the other adoption of materials such as solid-transparent plastic or silicone.

Figure 6:
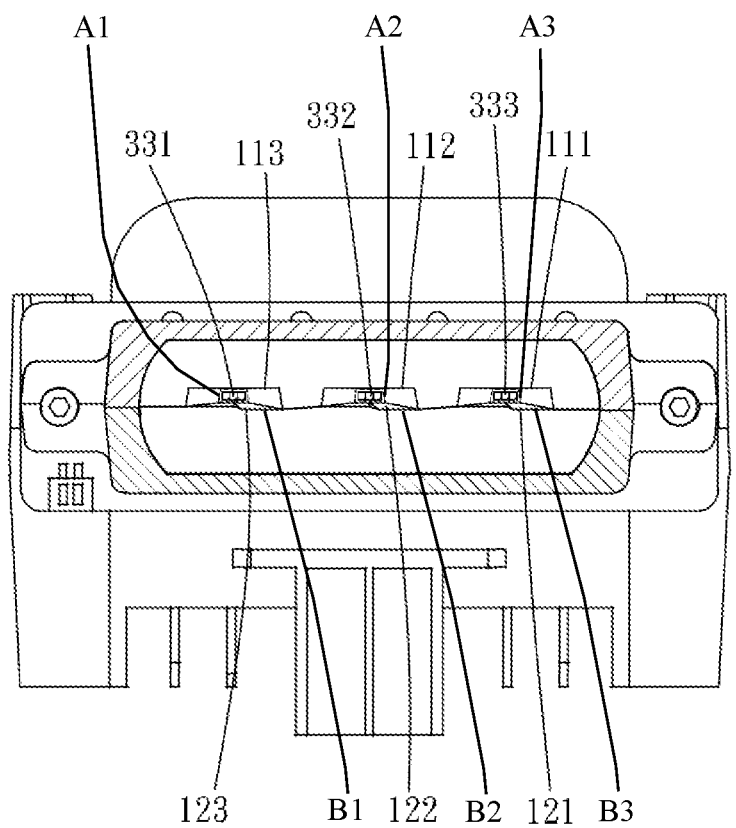
FIG. 6 illustrates another cross-sectional view of the hollow column of the light guide in FIG. 4
Figure 7:
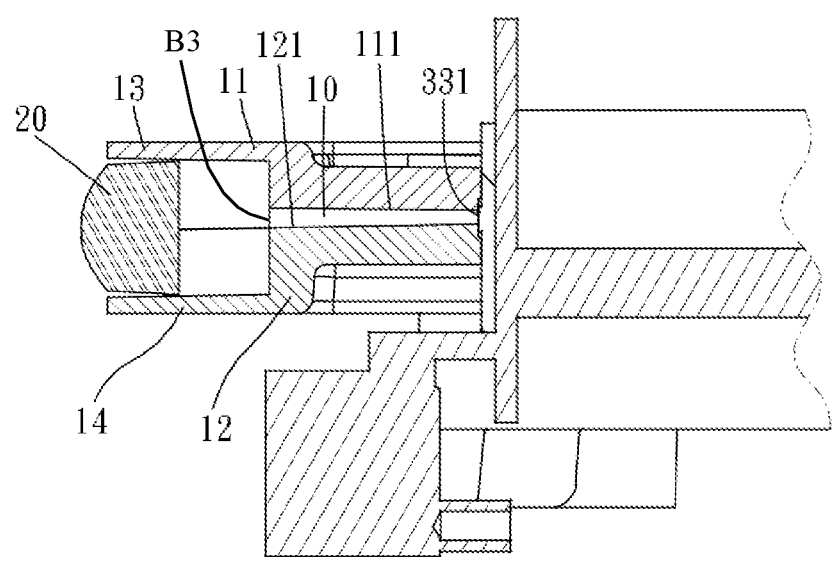
FIG. 7 illustrates another cross-sectional view of the hollow column of the light guide in FIG. 4.

In this embodiment as shown in FIG. 6 and FIG. 7, the hollow column of the light guide forms a closed cylindrical deployed in front of the emitting module 30, wherein the surfaces of the upper and lower chassis 11, 12 is respectively divided into linking edges and side walls. The reflective film may be applied to the side walls or applied together with the adjacent surfaces of the upper chassis 11 and the lower chassis 12. Moreover, the linking edges and the side walls of the light guide share the same boundary for sealing possible exposure, and the chassis may be made of a heat dispersion material avoiding an overheated module.

In this embodiment, the upper chassis 11 and the lower chassis 12 respectively protrude forward holding panels 13, 14 deployable for the light condensing lens 20 in help of dwindling the required elements and simplifying the assembly steps.

In this embodiment, the main emitting element 332 is a double-chip LED facing to the light guide equipped with a geometrical interior in assistance of casting a higher-right and lower-left light of distribution pattern. The secondary emitting elements 331, 333 are triple-chip LED projecting a distribution pattern with different optical lengths in order to provide a bilateral compensation for the main emitting element 332. Moreover, the emitting elements 331, 332, 333 may be connected to a dimmer for adjusting the light intensity emitted from emitting elements 331, 333 as a light compensation.

An additional explanation is that the interior of light guide 10 may have a solid column for light blending and for structural supporting purposes avoiding possible overheated deformation.

What is claimed is:

1. A light device for vehicle for providing a light with an elongated distribution pattern, comprising:
    a plurality of emitting modules, comprising a main emitting element and two secondary emitting elements bilaterally arranged beside the main emitting element;
    a light condensing lens; and
    a light guide, composed of at least two chassis, the adjacent two chassis have a plurality of adjacent side walls assembling a plurality of hollow columns corresponded with the plurality of emitting modules, the plurality of hollow columns defining a light incident side and a light output side away from each other, the plurality of emitting modules and the light condensing lens respectively mounted on the light incident side and the light output side,
    wherein the adjacent side walls of the adjacent two chassis are extended from the light incident side to the light output side to define a plurality of light inlets of the hollow columns nearby the plurality of emitting modules and a plurality of light outlets of the hollow columns nearby the light condensing lens, each of the light outlets having a long and narrow boundary, an elongated direction of the long and narrow boundary is the same as an elongated direction of the elongated distribution pattern, wherein the adjacent side walls are formed by protruding or indenting shapes from the adjacent two chassis.

2. The light device for vehicle as in claim 1, further comprising a reflective material applied onto interior surfaces of the at least two chassis.

3. The light device for vehicle as in claim 2, wherein the chassis respectively protrude forward holding panels deployable for the light condensing lens.

4. The light device for vehicle as in claim 2, wherein the plurality of light outlets of the hollow columns of the light guide contour a light distribution pattern.

5. The light device for vehicle as in claim 1, wherein the emitting modules are electrically connected to a dimmer.

6. The light device for vehicle as in claim 1, wherein the light guide has an interior deployed with a solid column.

7. The light device for vehicle as in claim 1, wherein a number of the light condensing lens corresponds with a number of the light guide.

* * * * *